United States Patent
Diemer

(10) Patent No.: US 10,174,794 B2
(45) Date of Patent: Jan. 8, 2019

(54) POWER TAKE-OFF ASSEMBLY HAVING A MULTIPLE STAGE CLUTCH

(71) Applicant: GM Global Technology Operations LLC, Detroit, MI (US)

(72) Inventor: Larry D. Diemer, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 146 days.

(21) Appl. No.: 15/222,406

(22) Filed: Jul. 28, 2016

(65) Prior Publication Data
US 2018/0031052 A1    Feb. 1, 2018

(51) Int. Cl.
| F16D 23/02 | (2006.01) |
| F16D 13/52 | (2006.01) |
| F16D 21/00 | (2006.01) |
| F16D 11/00 | (2006.01) |
| B60K 25/02 | (2006.01) |
| B60K 25/06 | (2006.01) |
| F16D 25/0638 | (2006.01) |
| B60K 17/28 | (2006.01) |

(52) U.S. Cl.
CPC .............. *F16D 23/02* (2013.01); *B60K 17/28* (2013.01); *B60K 25/02* (2013.01); *B60K 25/06* (2013.01); *F16D 11/00* (2013.01); *F16D 13/52* (2013.01); *F16D 21/00* (2013.01); *F16D 25/0638* (2013.01)

(58) Field of Classification Search
CPC ........ B60Y 2400/422; B60Y 2200/221; B60K 25/00; B60K 17/28; B60K 25/02; B60K 2025/065; F16D 23/025; F16D 23/04; F16D 2023/0681; F16D 11/00; F16D 13/52; F16D 21/00
See application file for complete search history.

(56) References Cited

U.S. PATENT DOCUMENTS

| 1,907,794 | A | * | 5/1933 | Griswold | ............... F16D 11/10 192/53.5 |
| 2,350,411 | A | * | 6/1944 | Nabstedt | ............... F16D 23/04 192/53.5 |
| 3,063,529 | A | * | 11/1962 | Cook | ............... F16D 23/04 192/48.5 |
| 3,507,372 | A | | 4/1970 | Gilbertson et al. | |
| 3,856,121 | A | * | 12/1974 | Usui | ............... F16D 23/06 192/53.34 |
| 4,275,607 | A | | 6/1981 | Snoy | |
| 4,479,395 | A | * | 10/1984 | Riley | ............... B60K 17/16 74/15.82 |

(Continued)

*Primary Examiner* — Paul N Dickson
*Assistant Examiner* — Timothy Wilhelm

(57) ABSTRACT

A power take-off clutch assembly having a rotatable input member configured to receive a torque input, a rotatable output member coaxially located with the rotatable input member, a synchronizing clutch configured to selectively synchronize the rotation speed of the output member with the rotation speed of the input member, and a locking clutch configured to selectively lock the rotation of the output member with the rotation of the input member. A single actuatable member selectively sequentially actuate the synchronizing clutch to match the rotational speed of the output member with the rotational speed of the input member and then the locking clutch to lock the rotation of the second member to the first member.

18 Claims, 3 Drawing Sheets

(56) References Cited

U.S. PATENT DOCUMENTS

| | | | | |
|---|---|---|---|---|
| 4,523,493 A * | 6/1985 | Weiß | | B60K 17/04 475/205 |
| 4,565,102 A | 1/1986 | Miyahara et al. | | |
| 4,716,775 A * | 1/1988 | Horii | | F16H 3/085 74/15.4 |
| 4,732,247 A * | 3/1988 | Frost | | F16D 23/06 192/53.31 |
| 4,869,353 A * | 9/1989 | Ohtsuki | | F16D 23/06 192/53.31 |
| 5,311,787 A * | 5/1994 | Wilson | | B60K 17/28 180/247 |
| 5,425,437 A * | 6/1995 | Nellums | | F16D 23/06 192/53.3 |
| 5,449,329 A * | 9/1995 | Brandon | | F16H 61/061 477/143 |
| 5,542,306 A * | 8/1996 | Fernandez | | B60K 17/28 188/264 E |
| 5,601,172 A | 2/1997 | Kale et al. | | |
| 5,645,363 A * | 7/1997 | Dafforn | | B60K 17/28 403/3 |
| 5,692,590 A * | 12/1997 | Iihara | | B60K 17/348 180/247 |
| 5,927,146 A * | 7/1999 | Dutson | | F16D 23/06 192/53.34 |
| 6,305,515 B1 * | 10/2001 | Heidenreich | | F16D 25/0638 192/103 F |
| 6,523,429 B2 * | 2/2003 | Desmarchelier | | F16H 3/089 74/15.4 |
| 6,557,682 B2 * | 5/2003 | Imamura | | F16D 41/125 192/46 |
| 6,854,541 B2 * | 2/2005 | Matufuji | | B60K 17/28 180/53.1 |
| 6,881,107 B2 * | 4/2005 | Roycroft | | B60F 3/0007 440/12.5 |
| 6,988,919 B2 * | 1/2006 | Tanaka | | B63H 21/14 440/88 C |
| 7,063,638 B2 * | 6/2006 | Weeramantry | | F16H 47/04 475/74 |
| 7,086,515 B2 * | 8/2006 | Kelley, Jr. | | F16D 23/04 192/48.3 |
| 7,108,115 B2 * | 9/2006 | Ebenhoch | | F16D 23/06 192/53.1 |
| 7,258,218 B2 * | 8/2007 | Kinpara | | F16D 13/52 192/70.2 |
| 7,546,914 B2 * | 6/2009 | Schranz | | B60K 23/0808 192/48.2 |
| 8,584,785 B2 * | 11/2013 | Marsh | | B60K 17/348 180/247 |
| 8,622,859 B2 * | 1/2014 | Babbitt | | B60K 6/12 475/1 |
| 8,771,137 B2 * | 7/2014 | Bolenbaugh | | F16D 48/06 477/5 |
| 8,905,212 B2 * | 12/2014 | Vierk | | F16D 11/14 192/53.1 |
| 8,910,766 B2 * | 12/2014 | Kriebernegg | | F16D 13/52 192/113.35 |
| 8,984,974 B2 * | 3/2015 | Seitz | | A62C 25/005 74/11 |
| 9,027,426 B2 * | 5/2015 | Roper | | F16D 23/06 192/53.33 |
| 9,151,339 B2 * | 10/2015 | Lee | | F16D 21/00 |
| 9,157,487 B2 * | 10/2015 | Alford | | B60K 17/28 |
| 9,194,443 B2 * | 11/2015 | Stix | | F16D 23/02 |
| 9,222,549 B2 * | 12/2015 | Mellet | | F16H 3/62 |
| 9,297,426 B2 * | 3/2016 | Graves | | B60K 17/28 |
| 9,315,102 B2 * | 4/2016 | Bordwell | | B60K 17/28 |
| 9,346,522 B2 * | 5/2016 | Ruosteinen | | B63H 11/08 |
| 9,487,086 B2 * | 11/2016 | Collett | | B60K 25/06 |
| 2003/0096671 A1 * | 5/2003 | Tanzer | | F16H 3/54 475/300 |
| 2006/0163020 A1 * | 7/2006 | Schmidt | | F16D 55/40 192/53.1 |
| 2010/0267508 A1 * | 10/2010 | Hvolka | | F16H 3/54 475/149 |
| 2012/0006643 A1 * | 1/2012 | Sporleder | | F16D 23/06 192/53.341 |
| 2013/0068046 A1 | 3/2013 | Mettler et al. | | |
| 2013/0267373 A1 * | 10/2013 | Mellet | | F16H 3/62 475/278 |
| 2015/0167750 A1 * | 6/2015 | Grogg | | F16D 23/06 192/53.1 |
| 2016/0369852 A1 * | 12/2016 | Vierk | | F16D 11/14 |

* cited by examiner

POWER TAKE-OFF ASSEMBLY HAVING A MULTIPLE STAGE CLUTCH

TECHNICAL FIELD

The present invention relates to a power take-off assembly, and more particularly to a power take-off clutch for the power take-off assembly.

BACKGROUND

Motor vehicles, such as industrial trucks and tractors, SUV's and trucks, etc., are known to utilize power take-off (PTO) assemblies to redirect a portion of the torque generated by the motor of the vehicle to power auxiliary equipment such as a water pump, an auger, a generator, a winch, or any equipment that may be attached to and powered by a rotating shaft. A PTO assembly may draw torque directly from the motor or the transmission of the vehicle and output the torque in the form of a rotating shaft. The PTO includes a clutch for selectively disengaging the transmittal of torque to rotate the output shaft when the PTO is not in use or when there is a need to change the auxiliary equipment attached to the shaft.

The clutch may operate under a variety of loads, depending on the auxiliary equipment attached to the PTO assembly. However, it may be difficult to engage the clutch smoothly due to the inertia of the auxiliary equipment or the load on the equipment. Thus there is a need for a clutch that is sufficient robust to transmit torque to a variety of auxiliary equipment while selectively engaging in a smooth and non-obtrusive manner.

SUMMARY

A power take-off clutch is provided. The power take-off clutch includes a rotatable input member configured to receive a torque input, a rotatable output member coaxially located with the rotatable input member, a synchronizing clutch configured to selectively synchronize the rotation speed of the output member with the rotation speed of the input member, and a locking clutch configured to selectively lock the rotation of the output member with the rotation of the input member.

In one aspect, the power take-off clutch further includes a selectively actuatable member configured to sequentially first actuate the synchronizing clutch and then the locking clutch.

In one aspect, the synchronizing clutch includes a plurality of input clutch plates axially slidably fixed to the input member and a plurality of output clutch plates axially slidably fixed to the output member. The plurality of input clutch plates is interleaved with the plurality of output clutch plates, thereby defining a pack of interleaved clutch plates.

In one aspect, the selectively actuatable member is disposed adjacent the pack of interleaved clutch plates and configured to apply an axial force to compress the pack of interleaved clutch plates, thereby synchronizing the rotation of the output member with the rotation of the input member.

In one aspect, the locking clutch includes an input engagement member axially slidably fixed to the input member and an output engagement member axially slidably fixed to the output member. The input engagement member is adjacent to the output engagement member.

In one aspect, the locking clutch is axially immediately adjacent the synchronizing clutch. One of the input engagement member and output engagement member is configured to selectively lock onto the other of the input engagement member and output engagement member.

In one aspect, the input engagement member is a first dog clutch member and the output engagement member is second dog clutch member complementary to the first dog clutch member.

In one aspect, the selectively actuatable member is disposed adjacent the synchronizing clutch and configured to apply an axial force through the synchronizing clutch to compress the input clutch member with the output clutch member, thereby rotationally fixing to the input member to the output member.

In one aspect, the power take-off clutch assembly further includes a spring biasing the input clutch member apart from the output clutch member.

In another aspect, the synchronizing clutch includes a friction disk axially slidable on a spline defined on an exterior surface of the output member. The friction disk is sandwiched between two metallic-disks axially slidable on a spline defined on input member. The actuatable member is axially adjacent one of the two metallic-disks.

In another embodiment, a power take-off assembly is provided. The power take-off assembly includes a housing rotatable about an axis, a hub coaxially nested within a housing and rotatable about the axis, a synchronizing clutch configured to selectively synchronize the rotation speed of the hub with the rotation speed of the housing, a locking clutch configured to selectively lock the rotation of the hub with the housing, and a selectively actuatable member configured to sequentially first actuate the synchronizing clutch and then the locking clutch.

In one aspect, the selectively actuatable member is a piston disposed within the housing axially adjacent the synchronizing clutch. The locking clutch is axially immediately adjacent the synchronizing clutch. The piston is axially slidable in a first direction to first engage the synchronizing the clutch and then the locking clutch, and in an opposite second direction to first disengage the locking clutch and then the synchronizing the clutch.

In one aspect, the synchronizing clutch includes a friction disk axially slidable on a spline defined on an exterior surface of the hub and two metallic-disks axially slidable on a spline defined on an interior surface of the housing. The friction disk is sandwiched between the metallic-disks and the piston is axially adjacent one of the two metallic-disks.

In one aspect, the synchronizing clutch includes a plurality of input clutch plates axially slidably on a spline defined on an interior surface of the housing and a plurality of output clutch plates slidable on a spline defined on an exterior surface of the hub. The plurality of input clutch plates is interleaved with the plurality of output clutch, thereby defining a pack of interleaved clutch plates.

In one aspect, the locking clutch includes a first dog clutch member and a second clutch member, wherein the second dog clutch member is complementary to the first dog clutch member.

In one aspect, the power take-off assembly further includes a restoring spring biasing the piston in one of a first direction and a second direction.

A powertrain system is provided. The powertrain system includes an engine for generating a torque output, a transmission coupled to the engine for receiving the torque output, a power take-off assembly configured to receive a portion of the torque output from the transmission or engine. The power take-off assembly includes a housing rotatable about an axis, a hub coaxially nested within the housing and rotatable about the axis, a synchronizing clutch configured to selectively synchronize the rotation speed of the hub with the rotation speed of the housing, a locking clutch configured to selectively lock the rotation of the hub with the housing, and a hydraulically actuable piston axially slidable in a first direction to first engage the synchronizing clutch and then engage the locking clutch, and in an opposite second direction to first disengage the locking clutch and then disengage the synchronizing the clutch, and a restoring spring biasing the piston in one of the first direction and the second direction.

In one aspect, the synchronizing clutch includes at least one first clutch plate axially slidade on a spline defined on an interior surface of the housing and at least one second clutch plate axially slidable on a spline defined on an exterior surface of the hub.

In another aspect, the locking clutch is a dog clutch.

In another aspect, the hub is connected to a shaft adapted to receive an axially device.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The above and other aspects will become more apparent and more readily appreciated from the following description of exemplary embodiments, taken in conjunction with the accompanying drawings in which.

DETAILED DESCRIPTION

Figure 1:
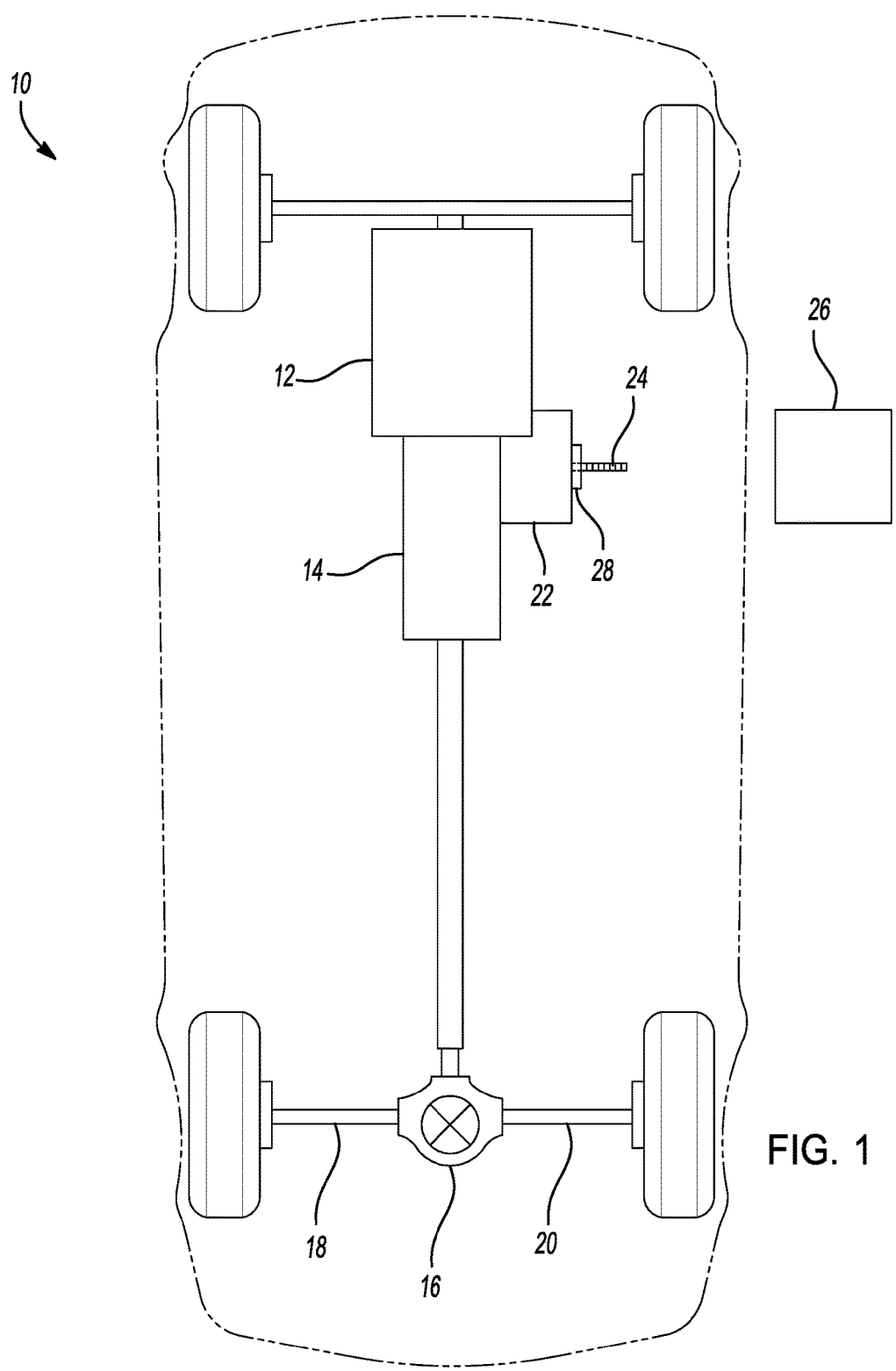
FIG. 1 is schematic illustration of a vehicle powertrain system having a power take-off assembly.

The following description is merely exemplary in nature and is not intended to limit the present disclosure, applications, or uses. Referring to FIG. 1, wherein like reference numerals correspond to like or similar elements throughout the figures, a powertrain system 10 is shown. The powertrain system 10 is generally used for propelling a motor vehicle (not shown). The powertrain system 10 includes a motor 12 connected to a transmission 14. The motor 12 generates a torque output, or drive torque, that is communicated to the transmission 14. The transmission 14 is connected to a differential 16 or other final drive unit. The transmission 14 transmits the torque output to the differential 16 which distributes the torque output to a left half-shaft 18 and/or right half-shaft 20 of the vehicle. The motor 12 may be a combustion engine, a hybrid engine, a Diesel engine, an electric motor, or any other prime mover. The transmission 14 may be an automatic transmission, a manual transmission, a stepped planetary transmission, a continuously variable transmission, or any other transmission capable of varying a speed ratio.

The powertrain system 10 also includes a power take-off assembly ("PTO") 22 for selectively redirecting a portion of the torque generated by the motor 12 to rotate a shaft 24 about an axis 25. The rotatable shaft 24 may be connected to an auxiliary equipment 26 that coverts the torque transmitted by the rotating shaft 24 into useful work. The auxiliary equipment 26 may include a pump, auger, generator, winch, various agriculture equipment, or another set of drive wheels to enable four-wheel drive. The PTO 22 includes a clutch assembly 30 for selectively transmitting torque to the rotatable shaft 24 and thus to the auxiliary equipment 26.

Figure 2:
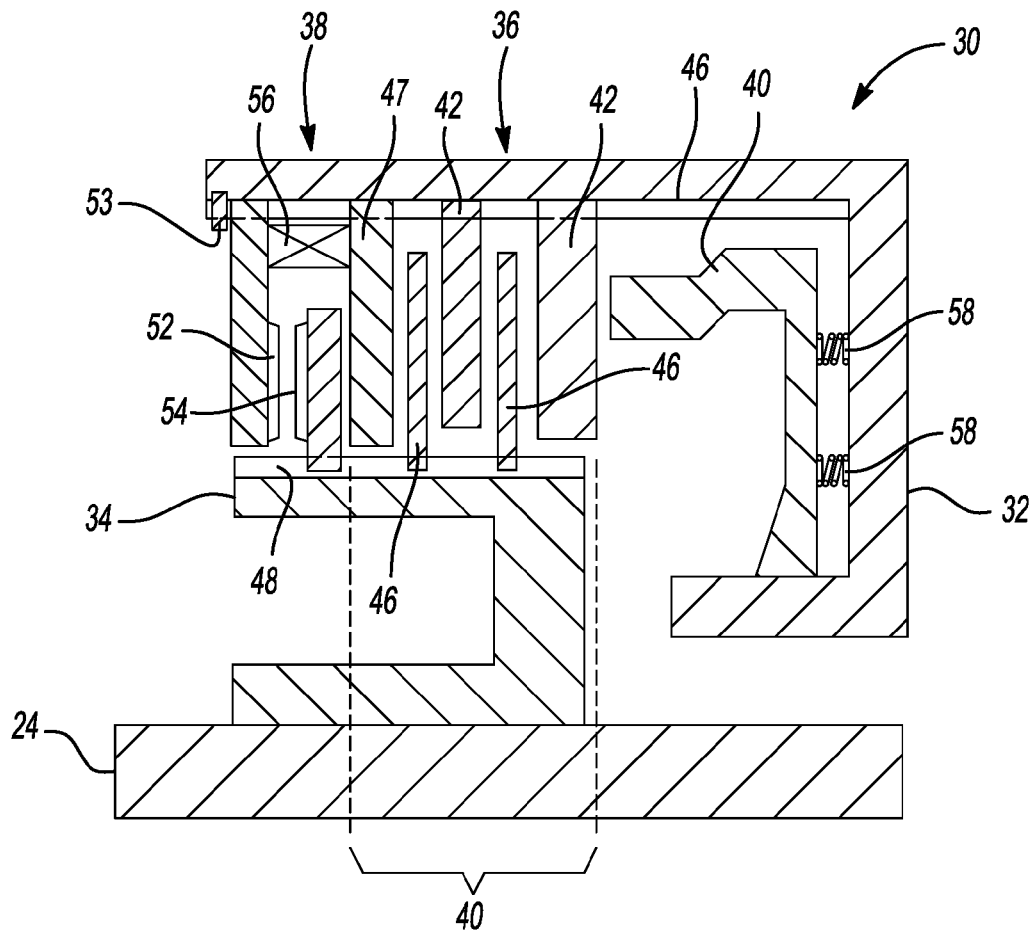
FIG. 2 is a fragmented schematic cross-section illustration of a clutch assembly for the power take-off assembly of FIG. 1.

Referring now to FIG. 2, a cross-section of a fragmented schematic cross-section illustration of an embodiment of PTO clutch assembly 30 of the present invention is shown. The PTO clutch assembly 30 includes a housing 32 or input member 32, a hub 34 or output member 34, a synchronizing clutch 36, and a locking clutch 38. The housing 32 is rotatable about the axis 25 and is connected and driven by torque from either the transmission 14 or the motor 12. The hub 34 is co-axially nested within the housing 32. The hub 34 is connected to the shaft 24. In an alternate embodiment, the hub 34 is the input member connected to the transmission 14 or motor 12 while the housing 32 is the output member connected to the shaft 24 and auxiliary equipment 26.

The synchronizing clutch 36 and the locking clutch 38 selectively rotationally connect the housing 32 with the hub 34. The synchronizing clutch 36 and the locking clutch 38 are sequentially actuatable by a single actuator 40, as will be described below. The synchronizing clutch 36 includes a multi-plate clutch pack 50 having a plurality of axially slidably moveable first clutch plates 42 disposed on a spline 46 defined on the interior surface of the housing 32, and a plurality of slidably moveable second clutch plates 46 disposed on a spline 48 defined on the exterior surface of the hub 34. The plurality of first clutch plates 42 is interleaved with the plurality of second clutch plates 46 to define the multi-plate clutch pack 50.

The locking clutch 38 is dog clutch or other positive lock clutch having a first slidably moveable positive engagement member 52 disposed on the spline 46 defined on the interior surface of the housing 32, and a second slidably moveable positive engagement member 54 disposed on the spline 48 defined on the exterior surface of the hub 34. An end-stop 53 is provided on an end of the spline 46 to limit the axial movement of the first slidably moveable positive engagement member 52. A first biasing member 56 is disposed within the housing 32 to urge the first positive engagement member 52 apart from the second positive engagement member 54, thereby disengaging the locking clutch 38.

The actuator 40 is selectively actuated to apply an axial force through the synchronizing clutch 36 to compress the multi-plate clutch pack 50 to match the rotational speed of the hub 34 with the rotational speed of the housing 32. The synchronizing clutch 36 synchronizes the rotational speed of the hub 34 with the rotational speed of the rotatable housing 32. As the difference in the rotational speed of the housing 32 and hub 34 approaches zero and the actuator 40 continues to move axially, the compressed clutch pack 50 engages the end plate 47 and moves the end plate 47 axially. The end plate 47 moves the second slidably moveable positive engagement member 54 axially to lock onto the first slidably moveable positive engagement member 52. The engaged positive engagement members 52, 54 positively locks the hub 34 to the housing 32 such that the housing 32 and the hub 34 rotates as a single unit. Thus, the actuator 40 selectively sequentially actuates the synchronizing clutch 36 first and then the locking clutch 38.

The actuator 40 shown is that of a hydraulically actuatable piston 40. A spring 58 is disposed in the housing 32 to exert a force on the piston 40 to move the piston 40 axially in one of a first direction toward the synchronizing clutch 36 and in a second apart from the synchronizing clutch 36. Hydraulic pressure may be supplied to move the piston 40 axially in the other of the first and second directions.

Figure 3:
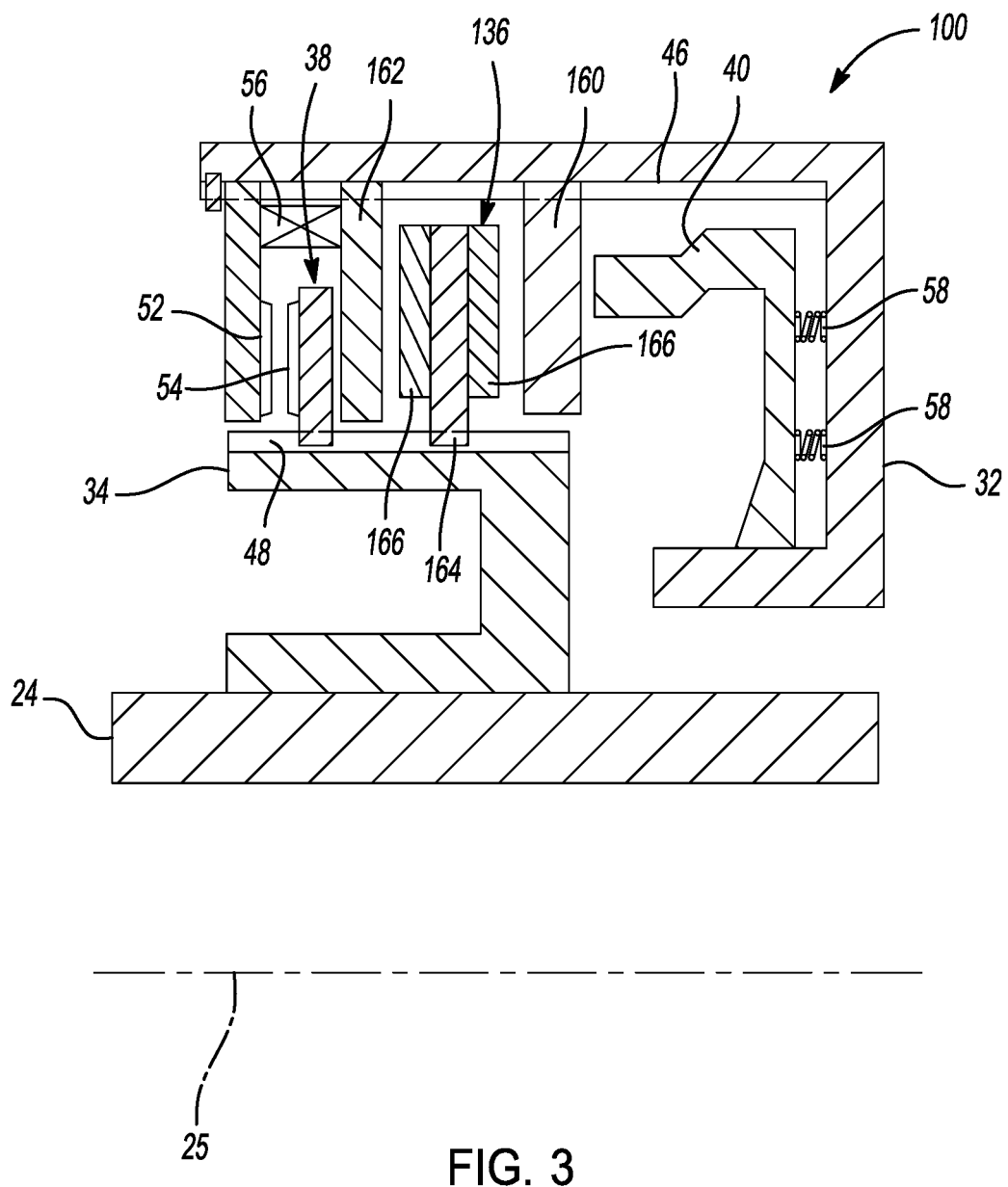
FIG. 3 is a fragmented schematic cross-section illustration of an alternative embodiment of the clutch assembly for the power take-off assembly of FIG. 1.

FIG. 3 shows a clutch assembly 130 having an alternative embodiment of a synchronizing clutch 136. The synchronizing clutch 136 includes a friction disk 164 having friction material on either side of the friction disk 164. The friction disk 164 is axially slidable on the spline 48 defined on the exterior surface of the hub 34. The friction disk 164 is sandwiched between a first and second metallic-disks 160, 162 and is axially slidable on the spline 46 defined on an interior surface of the housing 32. The piston 40 is selectively actuated to apply an axial force on the second metallic-disk 162 to actuate the synchronizing clutch 136.

It should be understood that the invention is not limited to the exact embodiment or construction which has been illustrated and described but that various changes may be made without departing from the spirit and the scope of the invention.

The following is claimed:

1. A power take-off clutch assembly, comprising:
a rotatable input member configured to receive a torque input;
a rotatable output member coaxially located with the rotatable input member;
a synchronizing clutch configured to selectively synchronize the rotation speed of the output member with the rotation speed of the input member;
a locking clutch configured to selectively lock the rotation of the output member with the rotation of the input member;
a selectively actuatable member configured to sequentially first actuate the synchronizing clutch and then the locking clutch; and
a restoring spring biasing the selectively actuatable member toward the synchronizing clutch.

2. The power take-off clutch assembly of claim 1, wherein the synchronizing clutch comprises:
a plurality of input clutch plates axially slidably fixed to the input member; and
a plurality of output clutch plates axially slidably fixed to the output member; and
wherein the plurality of input clutch plates is interleaved with the plurality of output clutch plates, thereby defining a pack of interleaved clutch plates.

3. The power take-off clutch assembly of claim 2, wherein the selectively actuatable member is disposed adjacent the pack of interleaved clutch plates and configured to apply an axial force to compress the pack of interleaved clutch plates, thereby synchronizing the rotation of the output member with the rotation of the input member.

4. The power take-off clutch assembly of claim 1, wherein the locking clutch comprises:
an input engagement member axially slidably fixed to the input member; and
an output engagement member axially slidably fixed to the output member;
wherein the input engagement member is adjacent to the output engagement member.

5. The power take-off clutch assembly of claim 4,
wherein the locking clutch is axially immediately adjacent the synchronizing clutch, and
wherein one of the input engagement member and output engagement member is configured to selectively lock onto the other of the input engagement member and output engagement member.

6. The power take-off clutch assembly of claim 5, wherein the input engagement member is a first dog clutch member and the output engagement member is second dog clutch member complementary to the first dog clutch member.

7. The power take-off clutch assembly of claim 5, wherein the selectively actuatable member is disposed adjacent the synchronizing clutch and configured to apply an axial force through the synchronizing clutch to compress the input engagement member with the output engagement member, thereby rotationally fixing to the input engagement member to the output engagement member.

8. The power take-off clutch assembly of claim 4, further comprising a spring biasing the input engagement member apart from the output engagement member.

9. The power take-off clutch assembly of claim 1, wherein the synchronizing clutch comprises:
a friction disk axially slidable on a spline defined on an exterior surface of the output member; and
wherein the friction disk is sandwiched between two metallic-disks axially slidable on a spline defined on input member; and
wherein the actuatable member is axially adjacent one of the two metallic-disks.

10. A power take-off assembly, comprising:
a housing rotatable about an axis;
a hub coaxially nested within a housing and rotatable about the axis;
a synchronizing clutch configured to selectively synchronize the rotation speed of the hub with the rotation speed of the housing;
a locking clutch configured to selectively lock the rotation of the hub with the housing;
a selectively actuatable member configured to sequentially first actuate the synchronizing clutch and then the locking clutch; and
a restoring spring biasing the selectively actuatable member toward the synchronizing clutch.

11. The power take-off assembly of claim 10,
wherein the selectively actuatable member is a piston disposed within the housing axially adjacent the synchronizing clutch;
wherein the locking clutch is axially immediately adjacent the synchronizing clutch, and
wherein the piston is axially slidable in a first direction to first actuate the synchronizing the clutch and then actuate the locking clutch, and in an opposite second direction to first disengage the locking clutch and then the synchronizing the clutch.

12. The power take-off assembly of claim 11, wherein the synchronizing clutch comprises:
a friction disk axially slidable on a spline defined on an exterior surface of the hub and two metallic-disks axially slidable on a spline defined on an interior surface of the housing,
wherein the friction disk is sandwiched between the metallic-disks, and
wherein the piston is axially adjacent one of the two metallic-disks.

13. The power take-off assembly of claim 12, wherein the locking clutch comprises a first dog clutch member and a second dog clutch member, wherein the second dog clutch member is complementary to the first dog clutch member.

14. The power take-off assembly of claim 11, wherein the synchronizing clutch comprises:
a plurality of input clutch plates axially slidably on a spline defined on an interior surface of the housing; and a plurality of output clutch plates slidable on a spline defined on an exterior surface of the hub; and wherein the plurality of input clutch plates is interleaved with the plurality of output clutch, thereby defining a pack of interleaved clutch plates.

15. A powertrain system comprising:

an engine for generating a torque output;

a transmission coupled to the engine for receiving the torque output;

a power take-off assembly configured to receive a portion of the torque output from the transmission or engine, comprising:

a housing rotatable about an axis;

a hub coaxially nested within the housing and rotatable about the axis;

a synchronizing clutch configured to selectively synchronize the rotation speed of the hub with the rotation speed of the housing;

a locking clutch configured to selectively lock the rotation of the hub with the housing, wherein the locking clutch is axially adjacent to the synchronizing clutch; and a hydraulically actuatable piston axially slidable in a first direction to actuate the synchronizing the clutch, thereby causing the synchronizing clutch to actuate the locking clutch, and in an opposite second direction to first disengage the locking clutch and then disengage the synchronizing the clutch; and a restoring spring biasing the piston toward the synchronizing clutch.

16. The powertrain system of claim 15, wherein the synchronizing clutch includes at least one first clutch plate axially slidade on a spline defined on an interior surface of the housing and at least one second clutch plate axially slidable on a spline defined on an exterior surface of the hub.

17. The powertrain system of claim 16, wherein the locking clutch comprises a dog clutch.

18. The powertrain system of claim 17, wherein the hub is connected to a shaft adapted to receive an auxiliary device.

* * * * *